United States Patent Office 3,840,668
Patented Oct. 8, 1974

3,840,668
METAPHOSPHATES AS DOUGH IMPROVERS
Robert R. Joiner, Belleville, and Frederick D. Vidal, Englewood Cliffs, N.J., assignors to Pennwalt Corporation, Philadelphia, Pa.
No Drawing. Filed Sept. 13, 1971, Ser. No. 180,157
Int. Cl. A21d 2/02, 2/04, 2/24
U.S. Cl. 426—22         5 Claims

ABSTRACT OF THE DISCLOSURE

A bread dough, containing about 2–50 (preferably 5–10), parts per million (based on flour present) of a metaphosphate either alone or in combination with a conventional oxidizing agent, yields in the finished loaf, when baked by any typical commercial process, increased volume and improved grain and texture and volume to weight ratio compared with a bread prepared from a dough not containing the required additive within the defined limits.

STATEMENT OF THE INVENTION

This invention relates to a composition useful for making bread. The invention more specifically relates to bread, and a dough composition for making bread containing a uniquely low but effective quantity of a metaphosphate (e.g. 2–50, preferably 5–10, parts per million parts of flour).

The baked bread formed from the dough composition of the present invention is characterized by generally increased bread volume, an improved volume to weight ratio, and *especially,* improved (i.e. a fine and uniform) grain and texture compared with a loaf from a comparative formula containing no metaphosphate; the baked loaf has improved crumb color, and better overall bread appearance. The improved results are achieved in all bread-making processes including the conventional ("straight" or "sponge") or continuous process. Additionally it is found that the improvement is enhanced when the metaphosphate is used in known systems of bread baking in combination with a conventional amount of an oxidizing agent, such as azodicarbonamide and bromate. Improvement is noted not only in the final product when using the dough of the present invention but it has been observed that the metaphosphate dough handles better during bread making processes, i.e. it is easier to mold and is "stronger" as evidenced by fewer collapses compared to dough in which no such additive is present.

PRIOR ART

In the prior art, it is known to use metaphosphates, orthophosphates and pyrophosphates as additives to edible materials. For a number of specific purposes, it is recognized that metaphosphates are preferred over the orthophosphates or pyrophosphates. It is also known to add metaphosphates to flours such as wheat flour (see U.S. 2,365,438) and to add metaphosphates as a part of a leavening agent for cake and biscuit doughs (see U.S. 2,366,857), in order to improve properties. The use of the metaphosphates has also been extensively discussed as a whipping agent in instant cake mixes and as an antioxidant for a wide variety of food products. In all of the prior art compositions substantially large quantities of metaphosphates are required. It is also known to add metaphosphates to dough for bread baking (see French Patent 726,324) at relatively large proportions (e.g. 100–500 p.p.m.) well beyond the recommended limit for the composition of the present invention.

Metaphosphates

Examples of metaphosphates suitable for use in the present invention include sodium hexametaphosphate, sodium trimetaphosphate, sodium tripolyphosphate (all available from a number of chemical manufacturers), Calgon SQ phosphate (available from Calgon Company) which represent linear, polylinear and polycyclic metaphosphate compositions having a wide range of molecular weights which generally are described as powdered or amorphous, glassy materials. Thus the term metaphosphate, as used herein includes the polyphosphate produced by heating simple metaphosphate to eliminate $H_2O$, as is well-known in the art, and the glassy phosphate produced by fusion and rapid cooling of the metaphosphate.

Oxidizing Agent

Particularly enhanced results are obtained upon baking a bread dough containing 2–50 parts per million metaphosphate and also a conventional amount of an oxidizing (i.e. maturing) agent such as an azodicarbonamide containing composition of which "Maturox" (a commercially available composition) is an example, potassium bromate, potassium iodate, chlorine dioxide and acetone peroxide formulations. These agents are added in conventional quantities varying from about 5–125 p.p.m., based on flour present, depending on the baking procedure used and the particular oxidizing agent used.

THE EXAMPLES—TESTS AND RATINGS USED

The invention will be better understood by reference to the Examples which are cited to illustrate the invention and not to limit it in any manner. The loaves produced are rated on the basis of the volume of the loaves (which varies with the particular type of processing) and inside loaf characteristics such as grain and texture which are scored comparatively with a perfect score being based on 100. In the tested systems a typical volume for a 100 g. loaf in the straight dough system and using untreated flour is about 600 ml.; in the sponge and continuous mix systems for a 450 gm. loaf, the typical is about 2750 ml. In interpreting the results reported in the Examples one must realize that truly comparative baking results are possible only among each day's runs with the same flour since if one attempts to run identical bakes on successive days using identical materials, there will always be some variation from bake to bake due to variations in temperature of the room or the temperature of the water, or to small variations in proof box or oven temperatures or to slight variations in manual or mechanical handling and the like. Similarly the degree of response varies widely with the particular flour used in a test bake. Since in the various series of bakes reported herein in different runs a number of different flour samples are used, varying degrees of response occur; thus only results of the same run within each Table are comparable.

In the Examples the processes employed (known as "straight," "sponge," and "continuous mix" systems and variations thereof) are not critical to the success of the invention and any system of baking can be used. The details of these commercial systems are well known in the art. All parts per million (p.p.m.) reported are based on the weight of the flour used. The "ratio" reported in the Tables is obtained by dividing the volume of the loaf in milliliters by the weight of the loaf in grams. Loaf volumes are reported in milliliters.

EXAMPLE 1

In a straight dough system 100 g. "pup" loaves are formed and baked using a formula which omits the use of oxidizing agents. The "straight" system uses a typical formulation:

100 g. Flour          5 g. Sugar
3 g. Yeast            0.25 g. Yeast Food
2 g. Salt             Variable—Water and the method generally involves a single step process in which all the ingredients are mixed together in a single batch before fermenting, molding, and proofing. The phosphate additive, when used, is added at the dough-up stage. The various phosphates and the parts per million employed (in parenthesis) is indicated in Table I, along with the observed results for four independent baking series (i.e. A, B, C and D). Control samples (which contain no added phosphate) are included in each series for comparative purposes.

TABLE I

| Run-loaf | Additive | Volume | Ratio | Score |
|---|---|---|---|---|
| A-1 | None (control) | 750 | 5.20 | 93.0 |
| A-2 | do | 730 | 5.28 | 93.0 |
| A-3 | Sodium tripolyphosphate (10) | 780 | 5.45 | 93.5 |
| A-4 | do | 760 | 5.35 | 93.5 |
| A-5 | Sodium hexametaphosphate (10) | 760 | 5.35 | 94.0 |
| A-6 | do | 745 | 5.25 | 93.5 |
| A-7 | Sodium hexametaphosphate (5) | 760 | 5.58 | 94.0 |
| A-8 | SQ phosphate (10) | 745 | 5.17 | 94.0 |
| A-9 | Insoluble sodium metaphosphate (10) | 780 | 5.40 | 94.0 |
| A-10 | Insoluble sodium metaphosphate (5) | 750 | 5.50 | 94.0 |
| A-11 | Sodium trimetaphosphate (5) | 750 | 5.42 | 94.0 |
| A-12 | Sodium phosphate, tribasic [1] (5) | 740 | 5.44 | 93.0 |
| B-1 | None (control) | 820 | 5.80 | 94.0 |
| B-2 | Sodium trimetaphosphate (50) | 845 | 5.95 | 94.5 |
| B-3 | Insoluble sodium metaphosphate (50) | 865 | 6.15 | 95.5 |
| B-4 | Sodium hexametaphosphate (50) | 830 | 5.91 | 95.0 |
| B-5 | Sodium trimetaphosphate (25) | 810 | 5.78 | 95.0 |
| B-6 | Insoluble sodium metaphosphate (25) | 860 | 6.10 | 95.5 |
| B-7 | Sodium hexametaphosphate (25) | 855 | 6.10 | 95.5 |
| B-8 | Insoluble sodium metaphosphate (5) | 815 | 5.81 | 94.0 |
| B-9 | Sodium hexametaphosphate (5) | 810 | 5.70 | 94.5 |
| C-1 | None (control) | 740 | 5.27 | 93.0 |
| C-2 | Insoluble sodium metaphosphate (50) | 735 | 5.15 | 93.0 |
| C-3 | Insoluble sodium metaphosphate (30) | 745 | 5.21 | 93.5 |
| C-4 | Insoluble sodium metaphosphate (20) | 750 | 5.32 | 93.0 |
| C-5 | Insoluble sodium metaphosphate (10) | 765 | 5.42 | 93.0 |
| C-6 | Insoluble sodium metaphosphate (5) | 750 | 5.25 | 93.0 |
| D-1 | None (control) | 760 | 5.51 | 93.0 |
| D-2 | Sodium hexametaphosphate (4) | 790 | 5.71 | 93.5 |
| D-3 | Sodium hexametaphosphate (2) | 770 | 5.42 | 93.5 |

[1] An orthophosphate.

The effectiveness of the metaphosphate additives even at the extremely low concentrations at which they are used and in the difficulty controllable art of bread making can be seen from the data of Table I. Run A illustrates the effectiveness of various additives within the preferred concentration range; of the nine loaves to which metaphosphate was added, seven are equal or superior to each control sample in all three measured variables while in the remaining two loaves (Nos. 6 and 8) superiority in at least two parameters is present compared to the average value of the controls.

Sample A-12 (wherein the additive is an orthophosphate) compared with A-7, A-10 and A-11 (containing metaphosphate at the same 5 p.p.m. level) illustrates the unexpected superiority of the metaphosphates to the orthophosphates.

Runs B and C demonstrate effectiveness of higher concentrations of metaphosphate within the scope of the invention while Run D illustrates effective use of concentrations of metaphosphate below the preferred limit.

EXAMPLE 2

In this example, the composition and technique of Example 1 is repeated, however, either azodicarbonamide (ADA) potassium bromate, or both ("WaTox") and metaphosphate (as "additive") are mixed into the flour prior to dough-up. The "additive," when used, with parts per million indicated in parenthesis, is reported in Table II along with observed results for two runs, E and F.

Comparison of loaves in run E containing the same quantity of oxidizer (e.g. 17–21, 11, 8 and 6) illustrates the enhancing effect of the metaphosphate particularly within the preferred range of metaphosphate concentration. The same effect is apparent when one compares the results of the metaphosphate-containing loaves (3–5 and 7–10) of run F with the control loaves containing only oxidizer (2 and 6) and the control containing no additive (1).

TABLE II

| Run-loaf | Additive | Volume | Ratio | Score |
|---|---|---|---|---|
| E-1 | None (Control) | 760 | 5.51 | 93.0 |
| E-2 | do | 740 | 5.28 | 93.0 |
| E-3 | ADA (20) | 885 | 6.22 | 96.0 |
| E-4 | ADA (10) | 845 | 6.05 | 95.5 |
| E-5 | ADA (5) | 830 | 5.91 | 95.0 |
| E-6 | ADA (15) | 850 | 5.85 | 96.0 |
| E-7 | ADA (10) plus sodium hexametaphosphate (2) | 875 | 6.24 | 96.5 |
| E-8 | ADA (15) plus sodium hexametaphosphate (2) | 915 | 6.38 | 97.0 |
| E-9 | ADA (20) plus sodium hexametaphosphate (2) | 900 | 6.33 | 97.0 |
| E-10 | ADA (10) plus sodium hexametaphosphate (4) | 880 | 6.29 | 96.5 |
| E-11 | ADA (15) plus sodium hexametaphosphate (4) | 905 | 6.41 | 97.0 |
| E-12 | ADA (5) plus sodium hexametaphosphate (5) | 830 | 5.88 | 95.5 |
| E-13 | do | 850 | 6.00 | 95.5 |
| E-14 | ADA (10) plus sodium hexametaphosphate (5) | 865 | 6.06 | 95.0 |
| E-15 | do | 870 | 6.12 | 96.0 |
| E-16 | ADA (5) plus sodium trimetaphosphate (5) | 850 | 6.00 | 96.5 |
| E-17 | ADA (15) plus sodium hexametaphosphate (10) | 880 | 6.12 | 96.0 |
| E-18 | ADA (15) plus sodium hexametaphosphate (20) | 850 | 5.93 | 95.0 |
| E-19 | ADA (15) plus sodium hexametaphosphate (30) | 870 | 6.08 | 95.5 |
| E-20 | ADA (15) plus sodium hexametaphosphate (40) | 875 | 6.11 | 96.0 |
| E-21 | ADA (15) plus sodium hexametaphosphate (50) | 885 | 6.22 | 96.5 |
| E-22 | ADA (5) plus SQ phosphate (5) | 860 | 6.09 | 96.5 |
| E-23 | ADA (10) plus SQ phosphate (5) | 845 | 6.02 | 96.0 |
| E-24 | ADA (5) plus insoluble sodium metaphosphate (5) | 840 | 6.03 | 95.5 |
| E-25 | ADA (10) plus insoluble sodium metaphosphate (5) | 855 | 6.05 | 96.0 |
| F-1 | None (control) | 720 | 5.02 | 93.0 |
| F-2 | WaTox (10-5) [1] | 830 | 5.79 | 96.0 |
| F-3 | WaTox (10-5) [1] plus sodium hexametaphosphate (20) | 840 | 5.88 | 96.5 |
| F-4 | WaTox (10-5) [1] plus sodium hexametaphosphate (30) | 840 | 5.86 | 96.0 |
| F-5 | WaTox (10-5) [1] plus sodium hexametaphosphate (50) | 810 | 5.70 | 96.5 |
| F-6 | Potassium bromate (10) | 795 | 5.60 | 95.0 |
| F-7 | Potassium bromate (10) plus sodium hexametaphosphate (5) | 830 | 5.75 | 96.5 |
| F-8 | Potassium bromate (10) plus sodium hexametaphosphate (10) | 820 | 5.77 | 95.0 |
| F-9 | Potassium bromate (10) plus sodium hexametaphosphate (30) | 820 | 5.70 | 95.0 |
| F-10 | Potassium bromate (10) plus sodium hexametaphosphate (40) | 830 | 5.83 | 95.5 |

[1] The first number within the parenthesis indicates bromate and the second, ADA, each in p.p.m.

EXAMPLE 3

This Example illustrates the addition of other phosphates to flour in the "sponge" system of baking, using the pound loaf method. The results are shown in Table III. The "sponge" method uses a typical formulation:

|  | Sponge | Dough |
|---|---|---|
| Flour, g | 420 | 280 |
| Water, ml | 252 | Variable |
| Yeast, g | 17.5 |  |
| Yeast food, g | 1.75 |  |
| Sugar, g |  | 42 |
| Salt, g |  | 14 |
| Shortening |  | 21 |
| Milk powder, g |  | 21 | and the method generally involves the mixing of 60% of the flour with water, yeast and yeast food followed by a fermentation period of 3–5 hours (in this case 4½ hours) to form a fermented dough or sponge. At the second or dough-up stage, the sponge is combined with unfermented dough formed from the remaining flour and other ingredients, mixed and followed with an additional short fermentation period. The final dough mixture is then molded, shaped, proofed and baked.

In making the loaves of this example, the "additive" when present, is added to the flour; each additive is present at a level of 5 parts per million parts of the flour used.

TABLE III

| Run-loaf | Additive | Volume | Ratio | Score |
|---|---|---|---|---|
| G-1 | None (control) | 2,715 | 5.85 | 93.5 |
| G-2 | Insoluble sodium metaphosphate | 2,780 | 6.03 | 94.0 |
| G-3 | SQ phosphate | 2,800 | 6.18 | 94.0 |
| G-4 | Sodium hexametaphosphate | 2,750 | 6.01 | 94.0 |
| G-5 | Sodium trimetaphosphate | 2,835 | 6.22 | 94.0 |

EXAMPLE 4

This example illustrates mixtures of azodicarbonamide (at a level of 10 p.p.m.) and metaphosphate (at a level of 5 p.p.m., except loaf 6 which contains 10 p.p.m.) in the sponge dough system of Example 3.

Observations are reported in Table IV.

TABLE IV

| Run-loaf | Additive | Volume | Ratio | Score |
|---|---|---|---|---|
| H-1 | None (control) | 2,640 | 5.73 | 93.5 |
| H-2 | ADA | 2,755 | 5.98 | 94.5 |
| H-3 | ADA | 2,760 | 6.05 | 95.5 |
| H-4 | ADA plus insoluble metaphosphate | 2,850 | 6.13 | 96.0 |
| H-5 | ADA plus insoluble sodium metaphosphate | 2,720 | 5.90 | 96.0 |
| H-6 | ADA plus sodium trimetaphosphate | 2,750 | 5.99 | 96.0 |
| H-7 | do | 2,770 | 6.00 | 96.0 |
| H-8 | ADA plus sodium hexametaphosphate | 2,750 | 6.00 | 96.5 |
| H-9 | do | 2,800 | 6.09 | 96.5 |

EXAMPLE 5

This Example illustrate the effect of potassium bromate (at a level of 10 p.p.m.) and iodate (at a level of 5 p.p.m.) as oxidizing agents in combination with metaphosphates (at a level of 5 p.p.m.) in the sponge system of Example 3 except that the "additive," when present is added 60% by weight to the sponge and 40% by weight to the dough-up, observations being reported in Table V.

TABLE V

| Run-loaf | Additive | Volume | Ratio | Score |
|---|---|---|---|---|
| I-1 | None (control) | 2,680 | 5.90 | 94.0 |
| I-2 | Potassium bromate | 2,820 | 6.25 | 95.0 |
| I-3 | Potassium iodate | 2,910 | 6.43 | 95.5 |
| I-4 | Potassium bromate plus insoluble soium metaphosphate | 2,860 | 6.31 | 95.0 |
| I-5 | Potassium bromate plus sodium hexametaphosphate | 3,020 | 6.64 | 96.0 |
| I-6 | do | 2,870 | 6.28 | 95.5 |
| I-7 | Potassium iodate plus insoluble sodium metaphosphate | 2,940 | 6.50 | 96.0 |
| I-8 | Potassium iodate plus sodium hexametaphosphate | 2,880 | 6.14 | 96.5 |

EXAMPLE 6

This Example shows the results of a combination of phosphates (at a 5 p.p.m. level) and chlorine dioxide (at a 10 p.p.m. level) as oxidizing agent in the "sponge" system of Example 3 except that all additive is added to the sponge dough. The results are shown in Table VI.

TABLE VI

| Run-loaf | Additive | Volume | Ratio | Score |
|---|---|---|---|---|
| J-1 | None (control) | 2,725 | 5.97 | 93.5 |
| J-2 | Chlorine dioxide | 2,820 | 6.23 | 96.0 |
| J-3 | Calcium phosphate tribasic* | 2,730 | 5.97 | 94.0 |
| J-4 | Chlorine dioxide plus insoluble sodium metaphosphate. | 2,880 | 6.36 | 95.5 |
| J-5 | Chlorine dioxide plus sodium hexametaphosphate. | 2,780 | 6.05 | 95.5 |
| J-6 | Chlorine dioxide plus sodium trimetaphosphate. | 2,810 | 6.16 | 97.0 |

NOTE.—*=orthophosphate.

EXAMPLE 7

This Example shows the results of the addition of phosphates (at a 5 p.p.m. level) and acetone peroxide (at a 125 p.p.m. level) as oxidizing agent in the "sponge" system of Example 3 where the additive is added to the sponge dough. The results are reported in Table VII.

TABLE VII

| Run-loaf | Additive | Volume | Ratio | Score |
|---|---|---|---|---|
| K-1 | None (control) | 2,650 | 5.70 | 93.0 |
| K-2 | Acetone peroxide | 2,660 | 5.75 | 93.5 |
| K-3 | Acetone peroxide plus insoluble sodium metaphosphate. | 2,780 | 5.95 | 96.0 |
| K-4 | Acetone peroxide plus sodium hexametaphosphate. | 2,850 | 6.12 | 96.5 |
| K-5 | do | 2,905 | 6.25 | 95.5 |
| K-6 | Acetone peroxide plus sodium trimetaphosphate. | 2,795 | 6.05 | 96.5 |
| K-7 | Acetone peroxide plus calcium phosphate tribasic.* | 2,790 | 6.05 | 94.0 |

NOTE.—*=orthophosphate.

EXAMPLE 8

This Example gives the effect of addition of different metaphosphates (at a level of 5 p.p.m.) using WaTox (trade name for a commercial product containing both azodicarbonamide and potassium bromate) as the oxidizing agent in a continuous mix process. The results are reported in Table VIII. WaTox is added at a dosage level to contribute 30 parts per million potassium bromate and 15 parts per million azodicarbonamide. Each additive is added to the dough.

A typical baking formulation is used in this continuous mix system as shown below:

| | Broth | Dough |
|---|---|---|
| Water | Variable—65% | |
| Flour | | 1,300 grams. |
| Sugar | 104 grams | |
| Salt | 29 grams | |
| Milk powder | 39 grams | |
| Yeast | 32.5 grams | |
| Yeast food | 6.5 grams | |
| Calcium acid phosphate | 1.3 grams | |
| Sodium propionate | 1.3 grams | |
| Shortening | | 39 grams. | and the method generally involves the fermentation of a broth for 2½ hours, after which the broth is combined with the flour and shortening in a premixer after which it passes into a continuous dough mixer which brings it to the proper degree of development. The dough is divided, panned, proofed and then baked.

TABLE VIII

| Run-loaf | Additive | Volume | Ratio | Score |
|---|---|---|---|---|
| L-1 | WaTox | 2,760 | 6.12 | 98.0 |
| L-2 | WaTox plus sodium trimetaphosphate | 2,660 | 5.97 | 99.0 |
| L-3 | WaTox plus sodium hexametaphosphate | 2,620 | 5.85 | 99.5 |
| L-4 | WaTox plus insoluble sodium metaphosphate | 2,610 | 5.83 | 100.0 |
| L-5 | WaTox minus sodium hexametaphosphate | 2,670 | 5.91 | 99.5 |

EXAMPLE 9

This Example shows the effects of the azodicarbonamide (at a 30 p.p.m. level) and metaphosphate (at a 5 p.p.m. level) in the continuous mix system of Example 8. The results are shown in Table IX.

TABLE IX

| Run-loaf | Additive | Volume | Ratio | Score |
|---|---|---|---|---|
| M-1 | ADA | 2,700 | 6.05 | 98.5 |
| M-2 | ADA plus sodium trimetaphosphate | 2,670 | 6.01 | 99.0 |
| M-3 | ADA plus sodium hexametaphosphate | 2,730 | 6.07 | 99.0 |
| M-4 | ADA plus insoluble sodium metaphosphate | 2,740 | 6.19 | 99.5 |

EXAMPLE 10

This Example shows the activity of chlorine dioxide, i.e. "Dyox" (at a level of 10 p.p.m.) treated flour, in combination with metaphosphates (at a level of 5 p.p.m.) using the continuous mix systems of Example 8 wherein potassium bromate, i.e. "Br" (at a level of 20 p.p.m.) and potassium iodate, i.e. "I" (at a level of 5 p.p.m.) are used as supplemental oxidizing agents.

TABLE X

| Run-loaf | Additive | Volume | Ratio | Score |
|---|---|---|---|---|
| N-1 | Dyox plus Br-I | 2,660 | 5.91 | 99.0 |
| N-2 | Dyox plus Br-I plus sodium trimetaphosphate | 2,670 | 6.00 | 99.5 |
| N-3 | Dyox plus Br-I plus sodium hexametaphosphate | 2,640 | 5.88 | 100.0 |
| N-4 | do | 2,650 | 5.95 | 99.5 |

EXAMPLE 11

This Example compares results achieved at high and low concentrations of metaphosphate oxidizer combinations. The system corresponds to the straight dough system of Example 1 wherein 100 gram "pup" loaves are baked. The numbers in parenthesis after each additive, where present, indicates the concentration of that component in parts per million based on the weight of flour used to make the loaf. The observations for four runs are reported in Table XI.

TABLE XI

| Run-loaf | Additive | Volume | Ratio | Score |
|---|---|---|---|---|
| O-1 | None (control) | 820 | 5.80 | 94.0 |
| O-2 | Sodium hexametaphosphate (25) | 855 | 6.10 | 95.5 |
| O-3 | Sodium hexametaphosphate (50) | 830 | 5.91 | 95.0 |
| O-4 | Sodium hexametaphosphate (100) | 830 | 5.85 | 94.0 |
| P-1 | None (control) | 775 | 5.45 | 93.0 |
| P-2 | ADA (20) | 885 | 6.22 | 96.0 |
| P-3 | ADA (20) plus sodium hexametaphosphate (2) | 900 | 6.33 | 97.0 |
| P-4 | ADA (20) plus sodium hexametaphosphate (250) | 895 | 6.30 | 97.0 |
| Q-1 | None (control) | 770 | 5.37 | 93.0 |
| Q-2 | ADA (15) | 850 | 6.01 | 95.5 |
| Q-3 | ADA (15) plus sodium hexametaphosphate 10) | 880 | 6.12 | 96.0 |
| Q-4 | ADA (15) plus sodium hexametaphosphate (50) | 885 | 6.22 | 96.5 |
| R-1 | None (control) | 730 | 5.05 | 93.5 |
| R-2 | Potassium bromate (10) | 795 | 5.60 | 95.0 |
| R-3 | Potassium bromate 10) plus sodium hexametaphosphate (5) | 830 | 5.75 | 96.0 |
| R-4 | Potassium bromate (10) plus sodium hexametaphosphate (100) | 810 | 5.70 | 96.0 |
| R-5 | Potassium bromate (10) plus sodium hexametaphosphate (500) | 825 | 5.72 | 95.5 |

The results reported in Table XI indicate that when higher than 50 p.p.m. concentration of metaphosphate is used, the improvement tends to be lost or to plateau in some instances.

EXAMPLE 12

The procedure of Example 11 is followed in a customer-service laboratory (where particular effort is made to duplicate commercial operations) for five runs in which azodicarbonamide, i.e. "ADA" (at a level of 18 p.p.m., except in run U where a level of 31 p.p.m. is used) alone and in combination with various concentrations (indicated by the numeral in parenthesis and representing p.p.m.) of sodium hexametaphosphate. The observations are reported in Table XII and the "best" loaf or loaves in each run selected by the observer is indicated by the asterisk.

TABLE XII

| Run-loaf | Additive | Volume | Score |
|---|---|---|---|
| S-1 | ADA | 2,550 | 86 |
| S-2* | ADA plus sodium hexametaphosphate (10) | 2,700 | 88 |
| S-3 | ADA plus sodium hexametaphosphate (20) | 2,550 | 87 |
| T-1 | ADA | 2,875 | 86.0 |
| T-2* | ADA plus sodium hexametaphosphate (10) | 2,800 | 87.0 |
| T-3* | ADA plus sodium hexametaphosphate (20) | 2,900 | 86.5 |
| T-4 | ADA plus sodium hexametaphosphate (50) | 2,850 | 86.5 |
| T-5 | ADA plus sodium hexametaphosphate (100) | 2,850 | 86.0 |
| U-1 | ADA | 2,575 | 83.0 |
| U-2 | ADA plus sodium hexametaphosphate (10) | 2,550 | 84.0 |
| U-3 | ADA plus sodium hexametaphosphate (20) | 2,625 | 83.0 |
| U-4* | ADA plus sodium hexametaphosphate (40) | 2,700 | 85.0 |
| U-5 | ADA plus sodium hexametaphosphate (50) | 2,450 | 84.0 |
| V-1* | ADA | 2,650 | 86.0 |
| V-2 | ADA plus sodium hexametaphosphate (100) | 2,600 | 85.0 |
| V-3 | ADA plus sodium hexametaphosphate (250) | 2,625 | 84.0 |
| W-1 | ADA | 2,750 | 86.0 |
| W-2* | ADA plus sodium hexametaphosphate (10) | 2,800 | 88.0 |
| W-3 | ADA plus sodium hexametaphosphate (20) | 2,750 | 87.0 |
| W-4 | ADA plus sodium hexametaphosphate (30) | 2,725 | 86.5 |

Many equivalent modifications of the invention described herein will be apparent to those skilled in the art from a reading of the above without a departure from the inventive concept.

What is claimed is:

1. A bread dough composition containing from 2–50 parts per million based on the weight of flour present in said dough of a metaphosphate wherein said composition contains an amount of a conventional oxidizing agent selected from the group consisting of acetone peroxide, azodicarbonamide, chlorine dioxide, potassium bromate and potassium iodate effective to age said flour.

2. The composition of claim 1 wherein the metaphosphate is a linear, polylinear, or polycyclic phosphate.

3. The composition of Claim 2 wherein the metaphosphate is sodium hexametaphosphate.

4. In the method of making bread products by a process which comprises combining dough forming ingredients including an effective amount of an oxidizing agent and flour and thereafter processing, shaping and baking said dough the improvement which comprises adding to the flour 2–50 parts per million of a metaphosphate based on the weight of flour present in said dough.

5. The method of Claim 4 wherein said agent is azodicarbonamide and the metaphosphate is sodium hexametaphosphate.

References Cited
FOREIGN PATENTS

| | | | |
|---|---|---|---|
| 726,324 | 5/1932 | France | 99—91 |
| 1,132,793 | 11/1968 | Great Britain | 426—62 |

JAMES R. HOFFMAN, Primary Examiner

U.S. Cl. X.R.

426—26, 62, 152, 343